US008016369B2

(12) United States Patent
Breton et al.

(10) Patent No.: US 8,016,369 B2
(45) Date of Patent: Sep. 13, 2011

(54) TRACTION CHAIN ASSEMBLY FOR ELASTOMERIC TRACKS

(75) Inventors: Rémi Breton, Drummondville (CA); Danny Roy, Drummondville (CA)

(73) Assignee: Soucy International Inc., Drummondville, Quebec (CA)

( * ) Notice: Subject to any disclaimer, the term of this patent is extended or adjusted under 35 U.S.C. 154(b) by 197 days.

(21) Appl. No.: 12/514,226

(22) PCT Filed: Nov. 9, 2007

(86) PCT No.: PCT/CA2007/002013
§ 371 (c)(1),
(2), (4) Date: Jun. 18, 2009

(87) PCT Pub. No.: WO2008/055352
PCT Pub. Date: May 15, 2008

(65) Prior Publication Data
US 2010/0001580 A1   Jan. 7, 2010

(30) Foreign Application Priority Data

Nov. 9, 2006  (CA) .................................... 2567645

(51) Int. Cl.
*B62D 55/28*  (2006.01)
(52) U.S. Cl. ........ 305/180; 152/232; 152/233; 305/165; 305/60
(58) Field of Classification Search ............... 305/15, 305/19, 46, 51, 157, 165, 178, 180, 181, 305/185, 187, 60; 152/231, 232, 233, 243, 152/244, 236, 237; 440/12.56, 12.63, 12.64
See application file for complete search history.

(56) References Cited

U.S. PATENT DOCUMENTS

| 1,293,528 A | * | 2/1919 | Palmer ....................... 152/209.1 |
| 1,764,785 A | * | 6/1930 | Frykman ...................... 152/236 |
| 2,151,520 A | * | 3/1939 | Littmann ...................... 152/239 |
| 2,733,748 A | * | 2/1956 | Cranston, Sr. ................. 152/231 |
| 4,109,971 A | * | 8/1978 | Black et al. ..................... 305/51 |
| 4,403,639 A | * | 9/1983 | Holte ............................. 152/245 |
| 4,508,150 A | * | 4/1985 | Granryd ....................... 152/169 |
| 5,186,227 A | * | 2/1993 | Eriksson ................... 144/250.17 |
| 6,539,995 B2 | | 4/2003 | Airoldi et al. |
| 7,090,312 B2 | * | 8/2006 | Soucy et al. .................. 305/160 |
| 7,901,015 B1 | * | 3/2011 | Anderson ........................ 305/51 |
| 2003/0184157 A1 | * | 10/2003 | McNutt et al. ................ 305/180 |

FOREIGN PATENT DOCUMENTS

| CA | 2511866 | 1/2007 |
| DE | 103 54 486 | 3/2005 |
| EP | 305528 A1 * | 3/1989 |
| EP | 1518719 | 3/2005 |
| JP | 10 016836 | 1/1998 |
| JP | 2000-233777 | 8/2000 |
| JP | 2005-263090 | 9/2005 |

* cited by examiner

*Primary Examiner* — Russell Stormer
(74) *Attorney, Agent, or Firm* — Francois Cartier; Robert Brouillette; Brouillette & Partners

(57) ABSTRACT

A traction chain assembly for providing improved traction to elastomeric tracks is provided. The traction chain assembly comprises two side brackets adapted to be mounted on each side of the track and generally to the drive lugs thereof. The traction chain assembly further comprises generally two laterally extending chains which are attached to the side brackets and which further extend at least partially over the traction lugs located on the outer surface of the track and over which the assembly is disposed. Some of the chain links of the chains of the traction chain assembly are also generally equipped with outwardly projecting grousers for increasing the traction thereof.

20 Claims, 12 Drawing Sheets

TRACTION CHAIN ASSEMBLY FOR ELASTOMERIC TRACKS

CROSS-REFERENCE TO RELATED APPLICATIONS

The present patent application claims the benefits of priority of commonly assigned Canadian Patent Application No. 2,567,645, filed at the Canadian Intellectual Property Office on Nov. 9, 2006.

FIELD OF THE INVENTION

The present invention generally relates to traction chain assemblies used on vehicles to increase their traction. More particularly, the present invention relates to traction chain assemblies for use on tracked vehicles.

BACKGROUND OF THE INVENTION

Numerous types of vehicles are frequently used on terrain over which it is difficult for pneumatic tires to operate. Both military vehicles, such as tanks and other armoured vehicles, and civilian vehicles, such as tractors, forest and construction machinery and recreational vehicles, are sometime utilized on terrains which are very soft, for example sand and snow surfaces. Generally, pneumatic tires are not capable of efficient operation on such surfaces as they tend to burrow into the surface rather than riding across the surface.

In order to provide vehicles which could efficiently travel over soft surfaces, vehicles using endless track have been developed.

Originally, the tracks used on such tracked vehicles were made of a plurality of metallic links pivotally attached to each other in order to form an endless track. These tracks were, and still are, very heavy, and they generally cause serious damage to the roads and other surfaces over which they run and also generally result in an uncomfortable ride for the passengers. Some heavier vehicles, such as large excavators, still use metal tracks.

Hence, conventional metallic tracks have the disadvantages of being noisy and vibration prone, not sufficiently durable and/or not usable on road surfaces. Accordingly, substantial efforts have been made to construct quieter, smoother operating and more durable tracks for tracked vehicles.

In order to solve the problems caused by metallic tracks, elastomeric tracks have been developed and proposed in recent years. With the combination of elastomeric technology and a tremendous amount of trial and error, various types of elastomeric tracks are now available in the industry.

Elastomeric tracks are generally formed around a basic carcass or belt. The carcass includes a generally endless belt-shaped elastomeric member, a number of core bars (usually of metal, fiberglass or carbon fiber) embedded therein and aligned in the longitudinal direction thereof and extending in traverse directions thereof, and steel cords (tension-resistant members) embedded in the endless elastomeric member to surround the core bars circumferentially outwardly. Examples of such elastomeric tracks can be seen in U.S. Pat. Nos. 4,904,030 (Ono), 5,295,741 (Togashi et al.), 5,511,869 (Edwards et al.) and 6,241,327 (Gleasman).

However, the advent of elastomeric tracks has created another problem. Metallic tracks of the prior art had many disadvantages that current elastomeric tracks have generally solved such as damage to paved roads and noise. Metallic tracks had however the advantage to have a better grip or traction on icy and other flat and slippery surfaces. Indeed, the metallic cleats or grousers of these metallic tracks could "eat" into the ice in order to move. Elastomeric tracks do not have cleats and their ground-engaging lugs cannot "eat" into ice and thus, present some difficulties when driven on icy and other slippery surfaces.

Though there have been proposed solutions to the aforementioned problem, for example, the anti-skid system proposed in European Patent No. 1 518 719 (Kess), there is still a need for a device that can improve the traction of elastomeric tracks especially when the vehicle is traveling on icy and/or other slippery surfaces.

OBJECTS OF THE INVENTION

Accordingly, an object of the present invention is to provide a traction chain assembly which can be mounted on an elastomeric track to provide increased traction to the track.

Another object of the present invention is to provide a traction chain assembly which can be preferably tensioned with respect to the outer surface of the elastomeric track.

Other and further objects and advantages of the present invention will be obvious upon an understanding of the illustrative embodiments about to be described or will be indicated in the appended claims, and various advantages not referred to herein will occur to one skilled in the art upon employment of the invention in practice.

SUMMARY OF THE INVENTION

The traction chain assembly of the present invention is designed to be installed on the outer ground-engaging surface of an elastomeric track having an outer surface and an inner surface. More particularly, the traction chain assembly is adapted to be disposed over one or more traction lugs located on the outer ground-engaging surface of the track. Understandably, the traction chain assembly is used to improve the traction of a tracked vehicle when the driving conditions are such that the friction between the track and the ground is too low.

The traction chain assembly comprises at least one but preferably two laterally extending chain strands or the like. These chains are attached on both sides of the track using side brackets which are themselves mounted to the track via preferably, bolt, washer and nut assemblies. Other forms of fasteners are also possible.

According to an important aspect of the present invention, the chain strands extend at least partially over the traction lug(s) over which the traction chain assembly is mounted. By extending directly over the traction lug(s), most of the length of the chain strands contributes to increasing the traction capability of the track. Moreover, this configuration does not require bridging chain strands for connecting together the two laterally extending chain strands.

Consequently, in order for the chain strands to remain in place, the two chain strands are preferably secured together at some points along their length and preferably over the traction lug(s). Generally, the two chain strands are secured together by welding together two or more pairs of chain links, each pair comprising a link from each chain strand.

Moreover, in order to further increase the traction, some chain links of the chain strands are further equipped with outwardly projecting grousers or projections, preferably but not exclusively made of metal. It is to be understood that the shape of the grousers can vary; the present invention is therefore not so limited.

According to another important aspect of the present invention, the design of the side brackets allows the traction chain assembly to be relatively easily tighten over the outer surface of the track. More particularly, by leaving a gap between the side brackets and the drive lugs to which they are preferably mounted, it is possible to further screw the bolt, washer and nut assembly in order to close the gap. This screwing action generally pulls out the chain strands toward the sides of the track, effectively tightening the traction chain assembly.

The features of the present invention which are believed to be novel are set forth with particularity in the appended claims.

BRIEF DESCRIPTION OF THE DRAWINGS

The above and other objects, features and advantages of the invention will become more readily apparent from the following description, reference being made to the accompanying drawings in which.

DETAILED DESCRIPTION OF THE PREFERRED EMBODIMENT

A novel traction chain assembly for elastomeric tracks will be described hereinafter. Although the invention is described in terms of specific illustrative embodiments, it is to be understood that the embodiments described herein are by way of example only and that the scope of the invention is not intended to be limited thereby.

Figure 1:
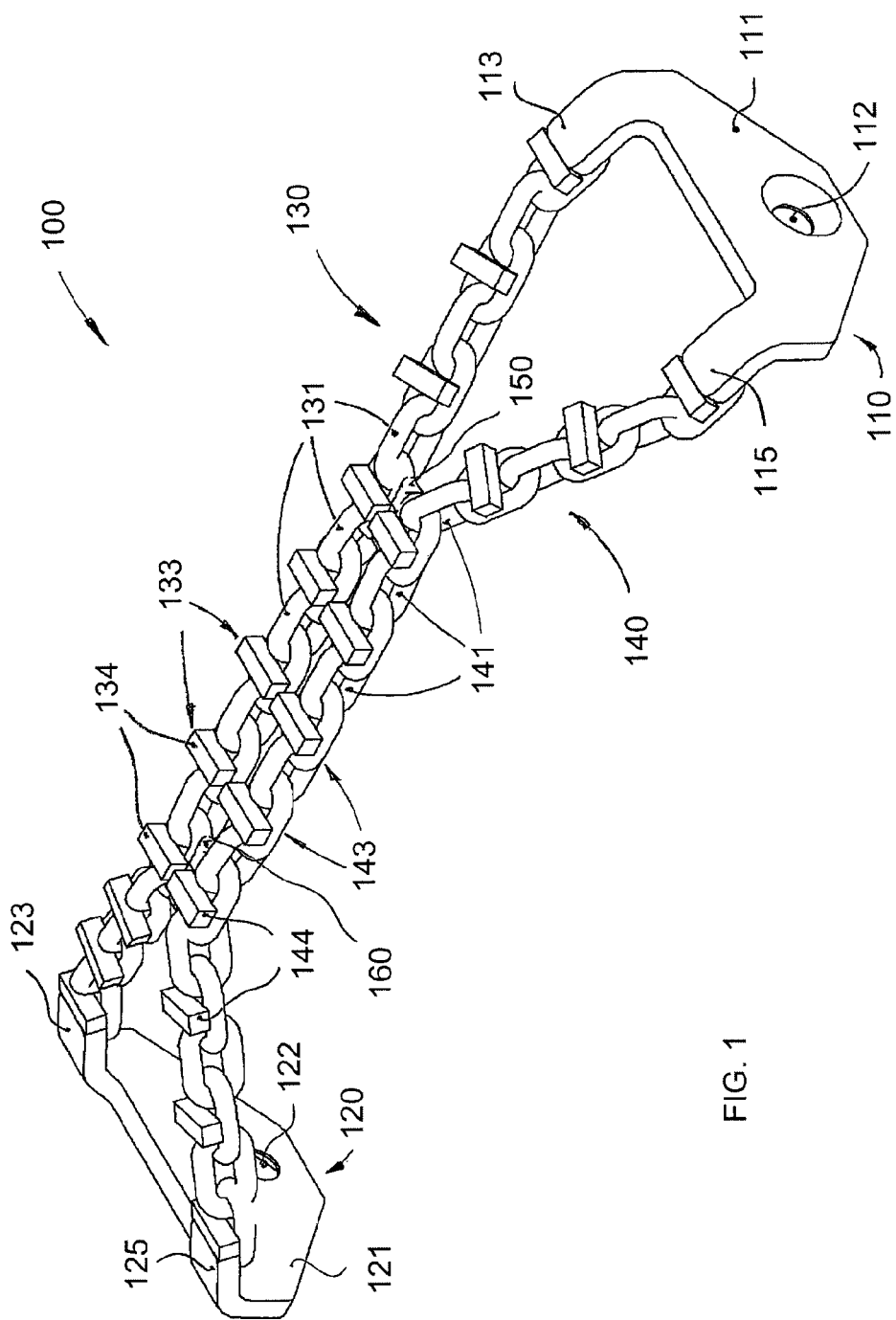
FIG. 1 is a perspective view of an embodiment of the traction chain assembly of the present invention.

Referring first to FIG. 1, a first preferred embodiment of the traction chain assembly 100 of the present invention is shown. The traction chain assembly 100 generally and preferably comprises two side mounting or attachment brackets 110 and 120 between which extend at least one and preferably two chain strands 130 and 140. Understandably, more than two strands could also be used with appropriate adaptations to the brackets 110 and 120.

The traction chain assembly 100 is preferably designed to be mounted over the outer surface 204 of a track 200 and more particularly, over the traction lugs 210 disposed thereon.

As mentioned above, the traction chain assembly 100 comprises a first side bracket 110 adapted to be mounted to a drive lug 220 on a first side of the track 200 and a second side bracket 120 also adapted to be mounted to a drive lug 220 but on the second opposite side of the track 200.

The side bracket 110 generally comprises a main portion 111. According to the preferred embodiment, the main portion 111 is generally flat and has a shape which generally conforms to the longitudinal cross-section of a drive lugs 220. The main portion 111 is also provided with a hole or aperture 112 therethrough for defining a passage for the bolt 116 (see FIG. 2). Outwardly extending from the main portion 111 are two spaced apart fingers 113 and 115 which are also at an angle with respect to the main portion 111.

Figure 6:
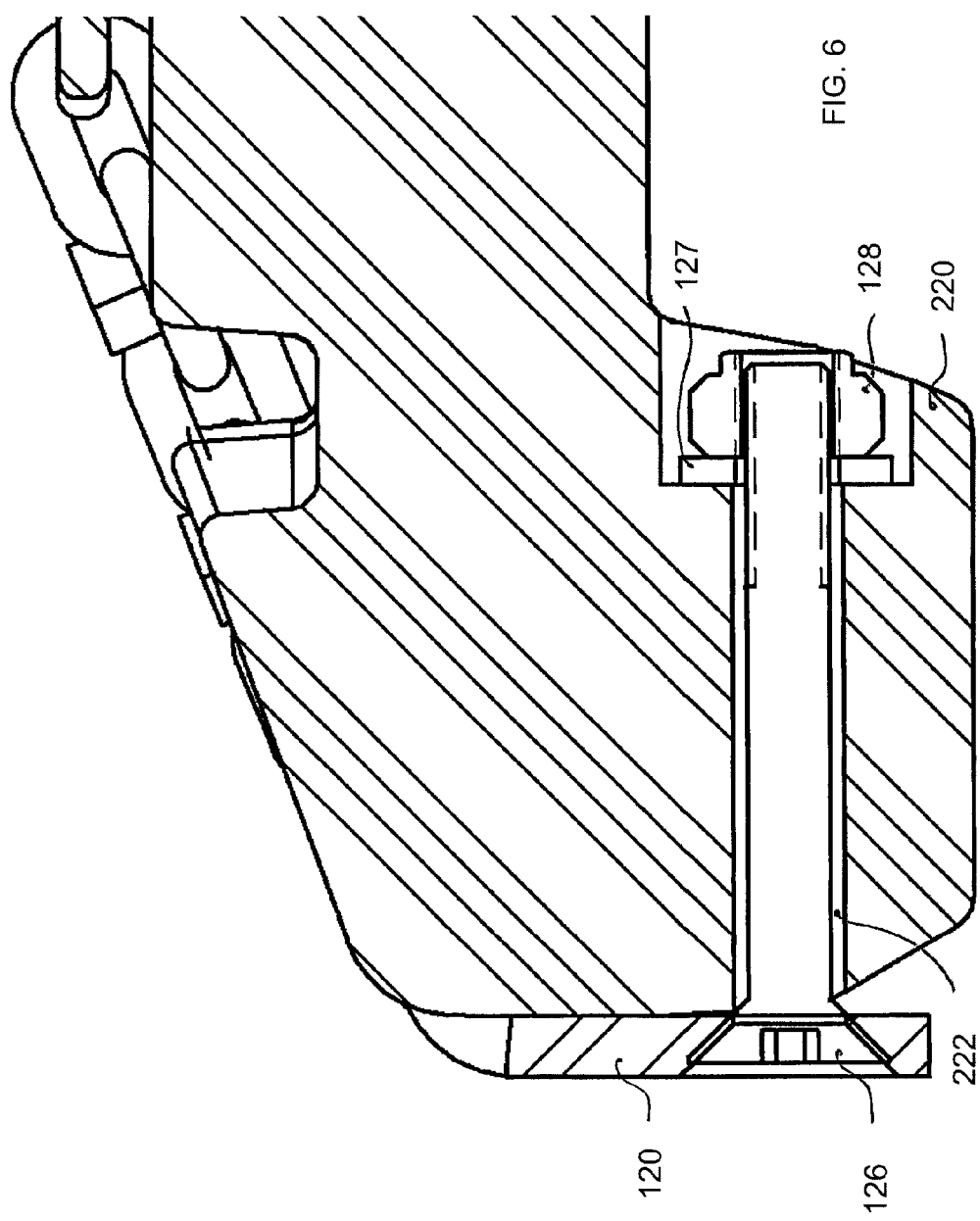
FIG. 6 is a fragmentary cross-sectional view of the attachment portion of the traction chain assembly shown in FIG. 1 as installed on a portion of a track.

Of similar construction, the side bracket 120 also generally comprises a main portion 121 provided with a hole 122 therethrough for the passage of the bolt 126 (see FIG. 6). As for side bracket 110, the shape of the side bracket 120 generally conforms to the longitudinal cross-section of a drive lug 220. Also, the side bracket 120 comprises two spaced apart and outwardly projecting fingers 123 and 125 which are, as for side bracket 110, at an angle with the main portion 121.

Still referring to FIG. 1, extending between fingers 113 and 123 is a first chain strand 130. Preferably, chain strand 130 is secured to the fingers 113 and 123 by welding or other similar process. Still, other ways to secure the strand 130 to the fingers 113 and 123 could be used. According to the present invention, chain strand 130 comprises two types of chain links: regular links 131 and traction links 133. The main difference between the regular links 131 and the traction links 133 is the presence of outwardly projecting grousers or projections 134 on the traction links 133. The traction links 133 are generally either integrally cast with the grousers 134 or the grousers are secured to regular link 131, generally by welding, after the chain strand is manufactured. In any case, the regular links 131 and the traction links 133 are generally disposed along the length of the strand 130 in an alternate manner.

Extending between fingers 115 and 125 and secured thereto is a second chain strand 140 which is generally of a construction similar to chain strand 130. Accordingly, chain strand 140 comprises chain links which are of two types: regular links 141 and traction links 143. As for the strand 130, the traction links 143 differ from regular links 141 by the presence of outwardly projecting grousers or projections 144. Also as for chain strand 130, the links of the chain strand 140 are generally disposed in an alternate manner. Understandably, the chain strands 130 and 140 are substantially of similar construction and are generally manufactured the same way.

In order to prevent unwanted movement of the traction chain assembly 100, the chain strands 130 and 140 preferably further secured together by welding (see 150 and 160 in FIG. 1) together two (see FIGS. 1 and 3) or more (see FIG. 11) pairs of chain links, each pair comprising a chain link from each chain strand.

Figure 2:
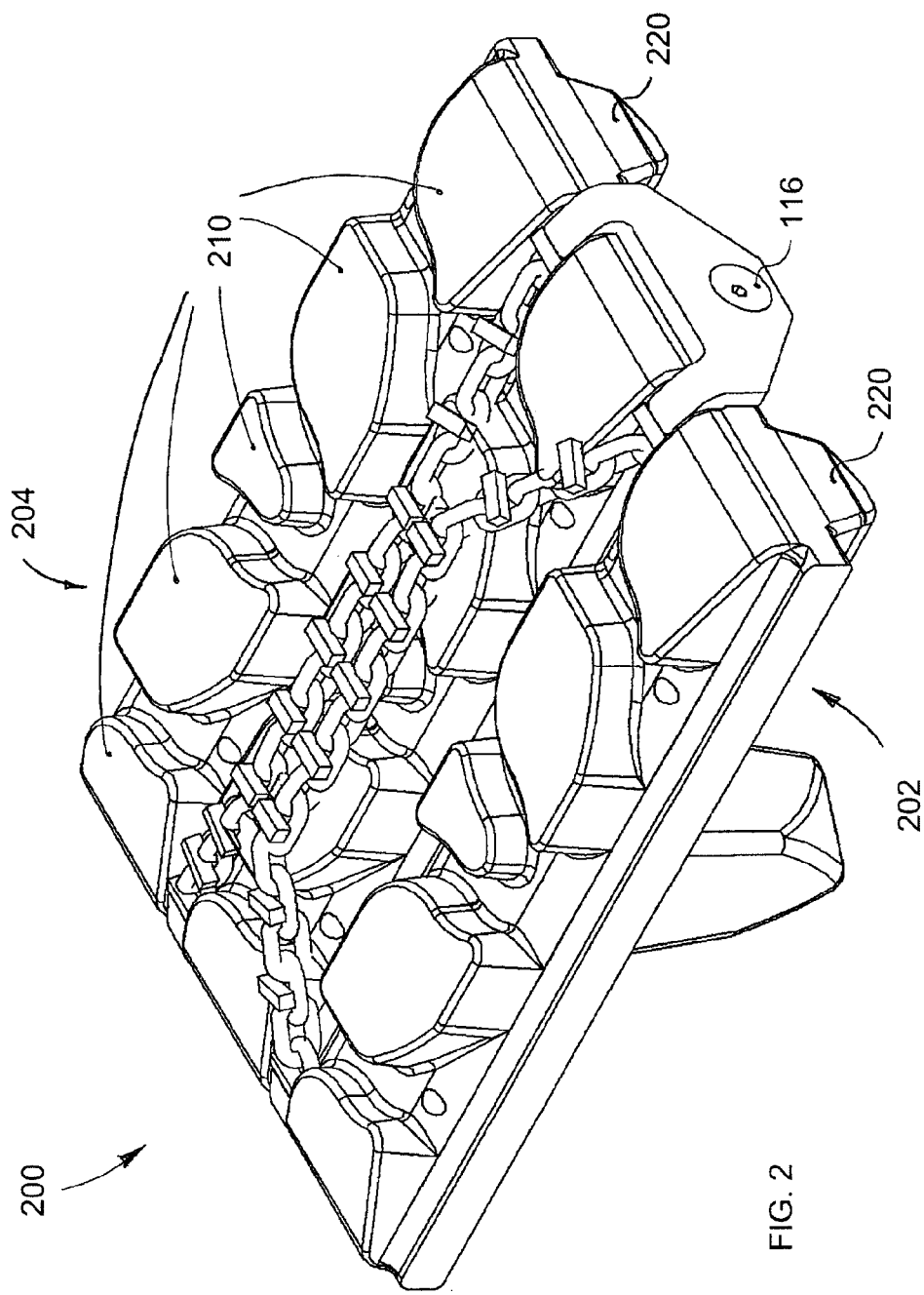
FIG. 2 is a perspective view of the embodiment shown in FIG. 1 as installed on a portion of a track.
Figure 3:
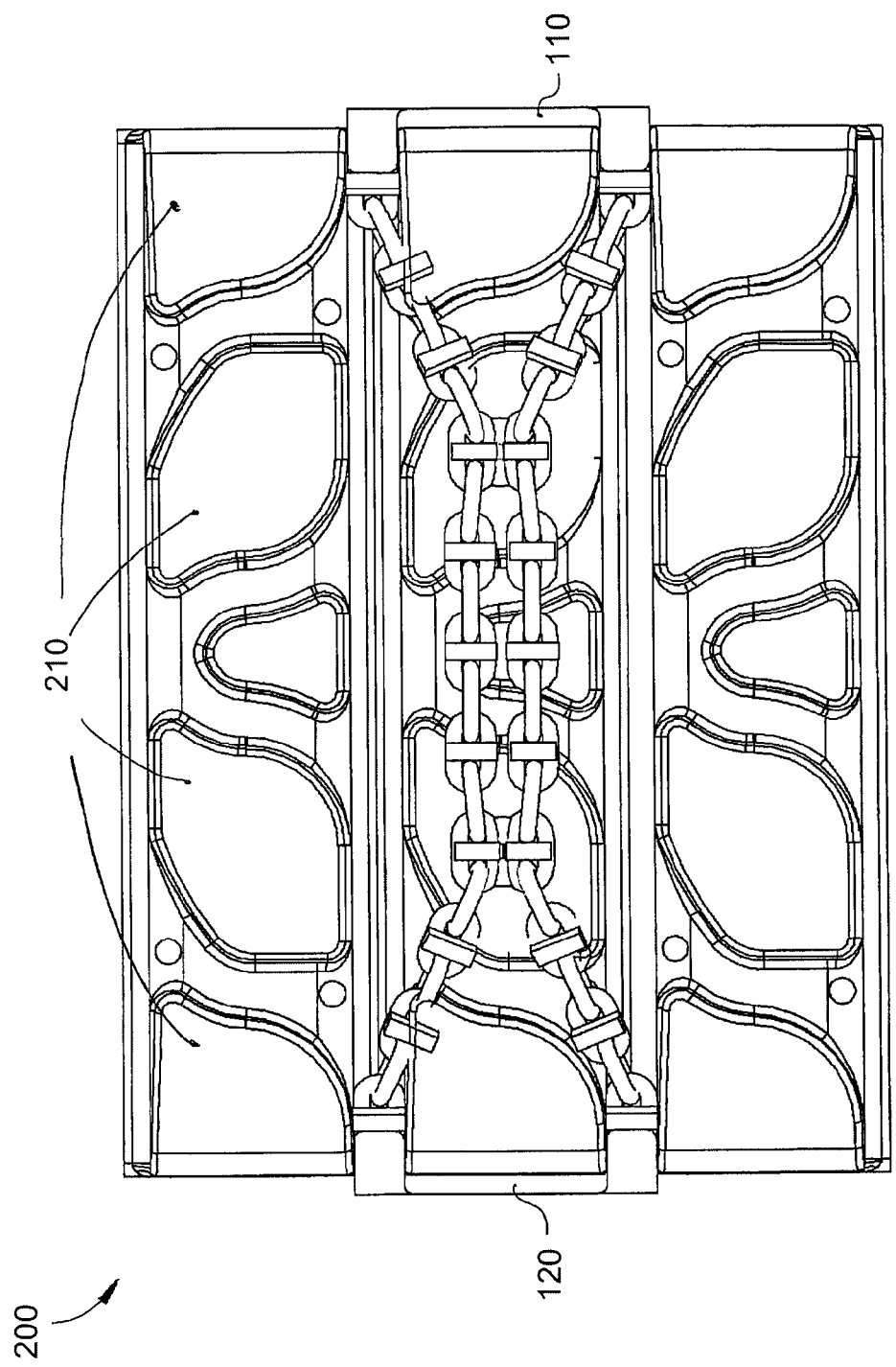
FIG. 3 is a top view of the embodiment shown in FIG. 1 as installed on a portion of a track.

Referring now to FIGS. 2 to 6, the traction chain assembly 100 is shown as installed over the outer surface 204 of a track 200. Preferably and as best shown in FIGS. 2 and 3, the traction chain assembly 100 mounted over traction lugs 210.

The skilled addressee will note that the space between the fingers 113 and 115 and 123 and 125 is dimensioned so that each pair of fingers can be received into the lug-less areas on each side of the traction lugs 210 and that a portion of the traction lug 210 fits into the space when the traction chain assembly 100 is mounted over a track 200. This is best shown in FIGS. 2 to 4.

Figure 9:
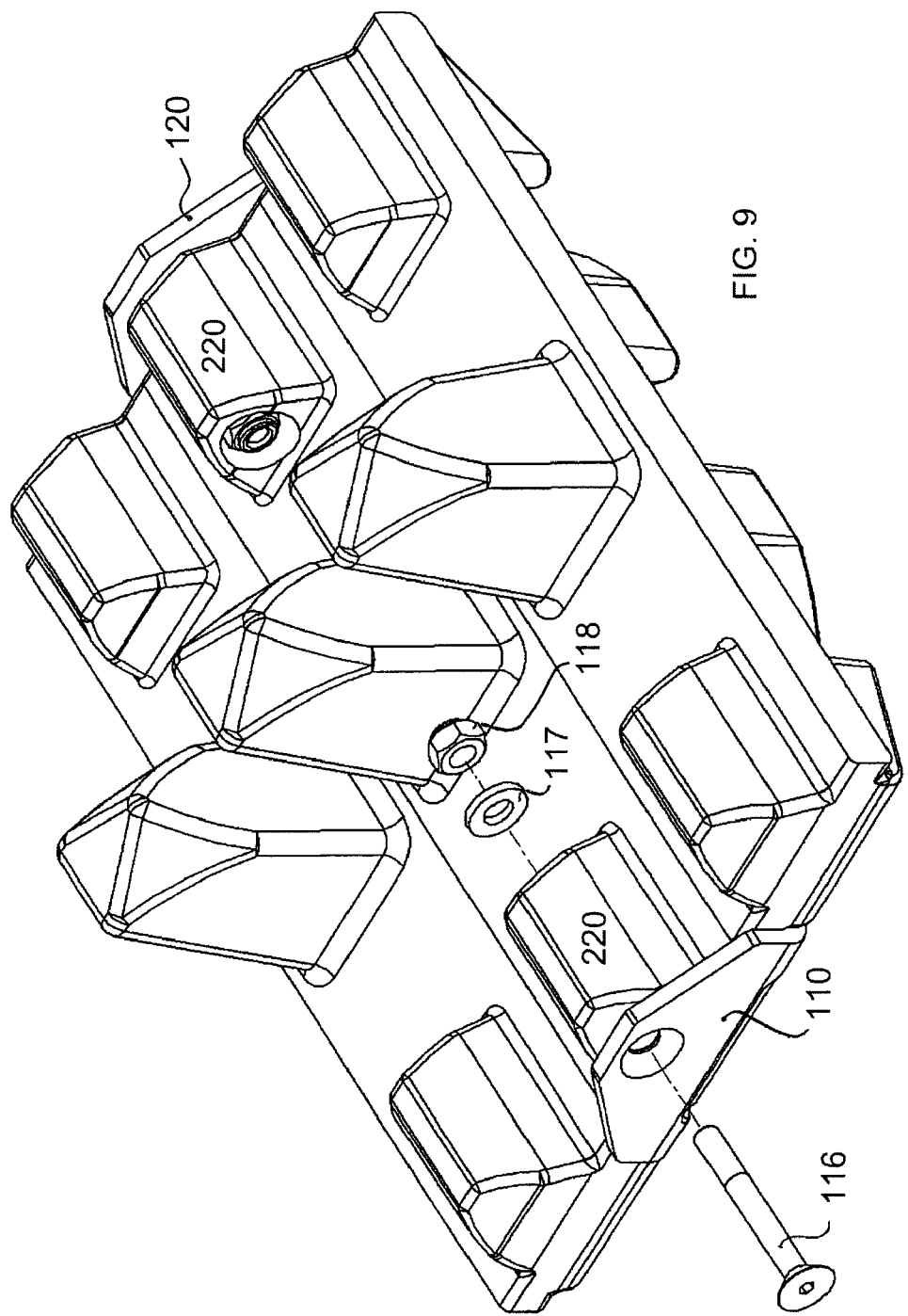
FIG. 9 is a perspective view of the inner side of a track with the traction chain assembly of FIG. 1 and showing the attachment portions thereof.
Figure 10:
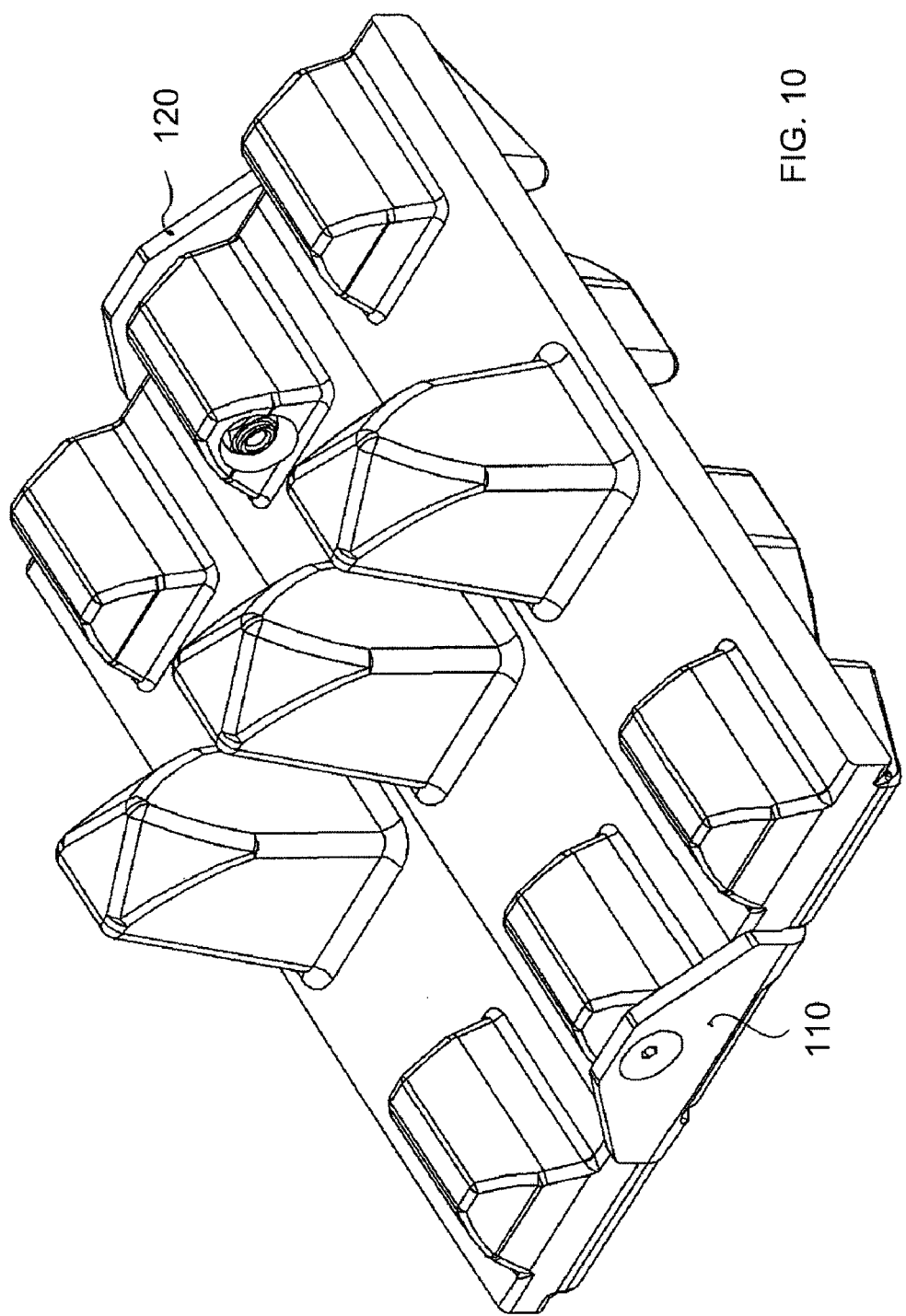
FIG. 10 is a perspective view of the inner side of a track with the traction chain assembly of FIG. 1 mounted thereon.

To fully secure the traction chain assembly 100 to the track 200, the side brackets 110 and 120 are removably attached to the drive lugs 220 located on the inner surface 202 and generally near or adjacent to the side edges of the track 200. As shown in FIG. 6, the drive lugs 220, to which the side brackets 110 and 120 are mounted, are preferably provided with hole 222 through which can extend the bolts 116 and 126 of side brackets 110 and 120 respectively. The bolts 116 and 126 are respectively further secured to the drive lugs 220 via washer 117 and nut 118 and washer 127 and nut 128. To prevent loosening of the nuts 118 and/or 128, locking fluid can advantageously be applied to the bolts and nuts and/or the nuts 118 and 128 can be of the locking type. FIGS. 9 and 10 show the inner surface of the track 200 when the side brackets 110 and 120 of the traction chain assembly 100 are mounted to the drive lugs 220.

Figure 4:
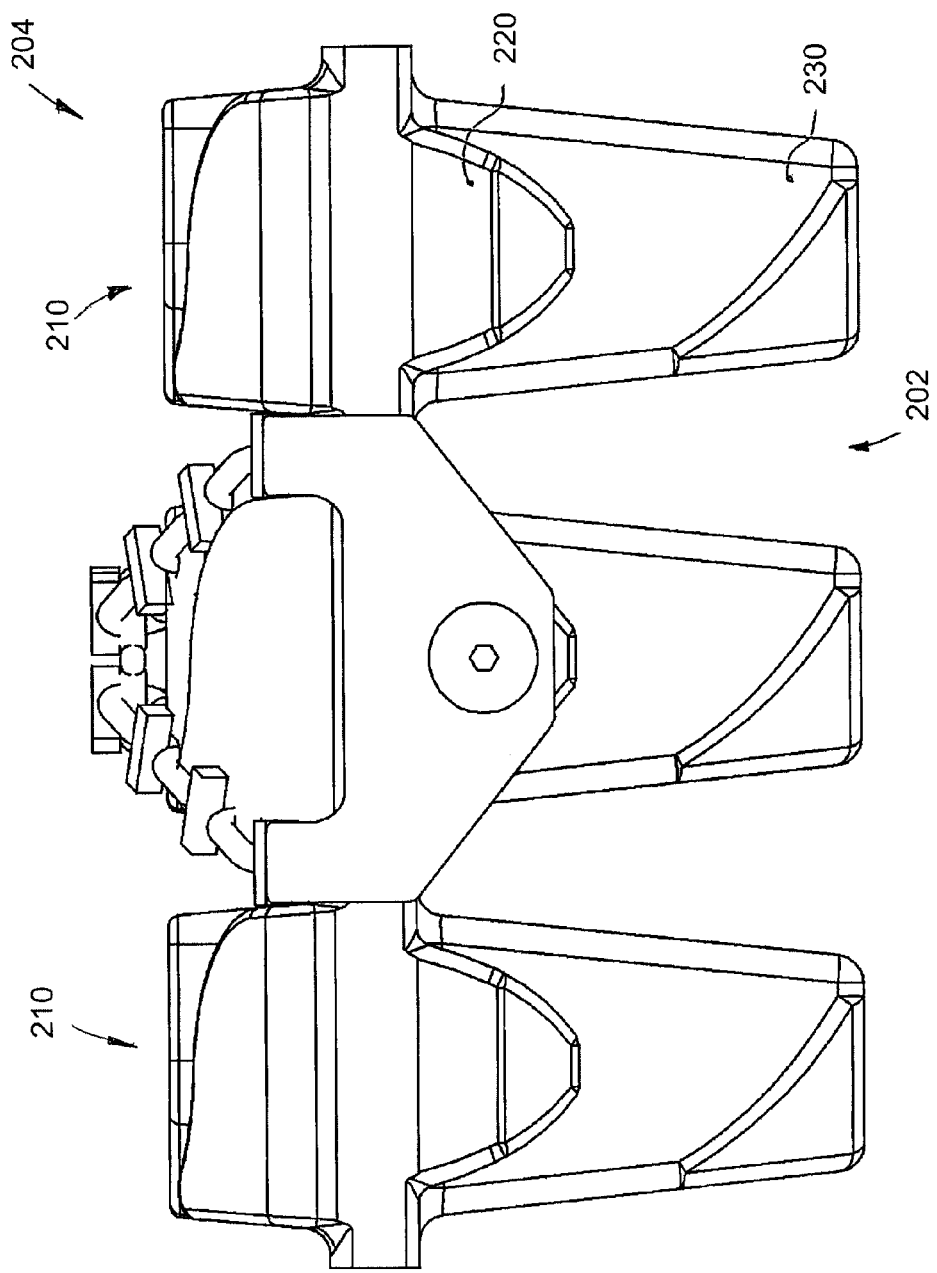
FIG. 4 is a side view of the embodiment shown in FIG. 1 as installed on a portion of a track.
Figure 5:
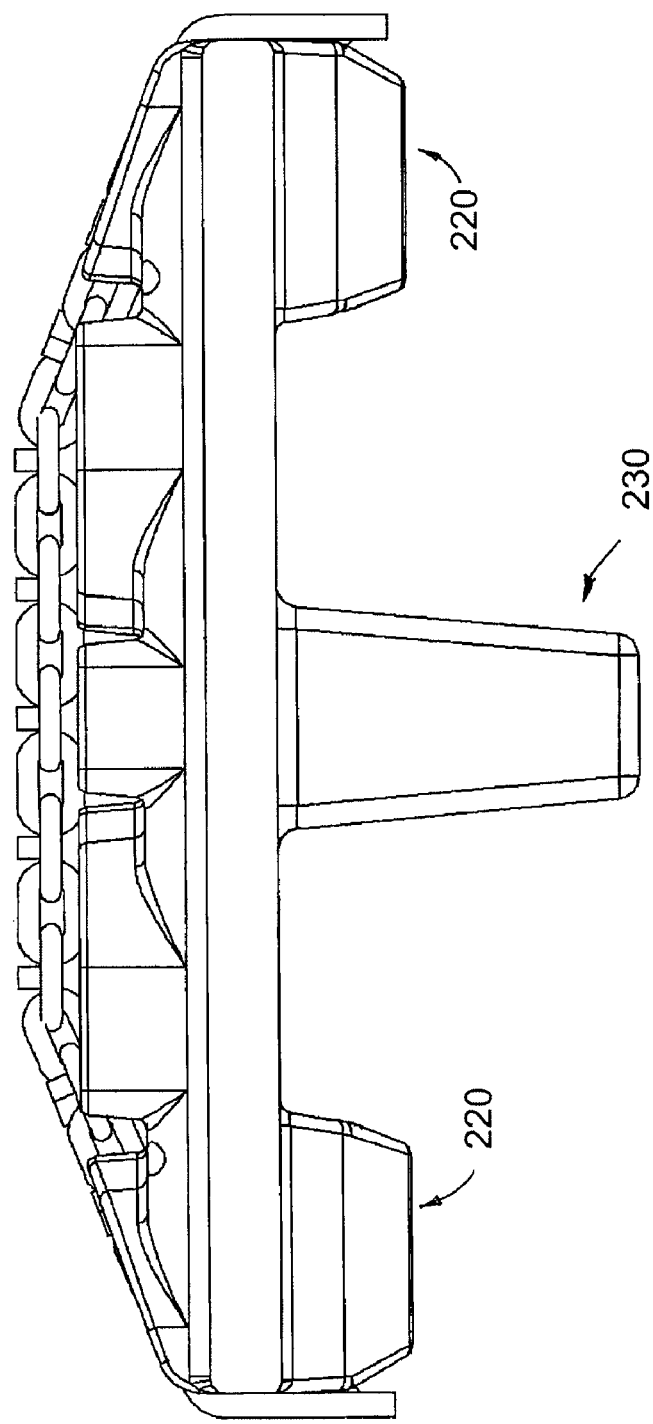
FIG. 5 is a longitudinal view of the embodiment shown in FIG. 1 as installed on a portion of a track.

According to the present invention and as shown in FIGS. 2 to 4, the chain strands 130 and 140 extend, at least partially, directly over the traction lugs 210. In fact, except for the small portions of the chain strands which are connected to the fingers, most of the length of the strands is located over the traction lugs 210 when the traction chain assembly 100 is installed, thereby improving the traction capability of the track 200. This particular arrangement does not need small bridging chain strands or other equivalent arrangements for linking the two laterally extending chain strands 130 and 140 since they are already directly secured together. Moreover, this arrangement is less prone to unwanted movements and/or to loosening. Understandably, if the traction chain assembly 100 is loose and/or moves away from the traction lugs 210, then the increase in traction provided by the assembly 100 is partially or even substantially lost.

Figure 7:
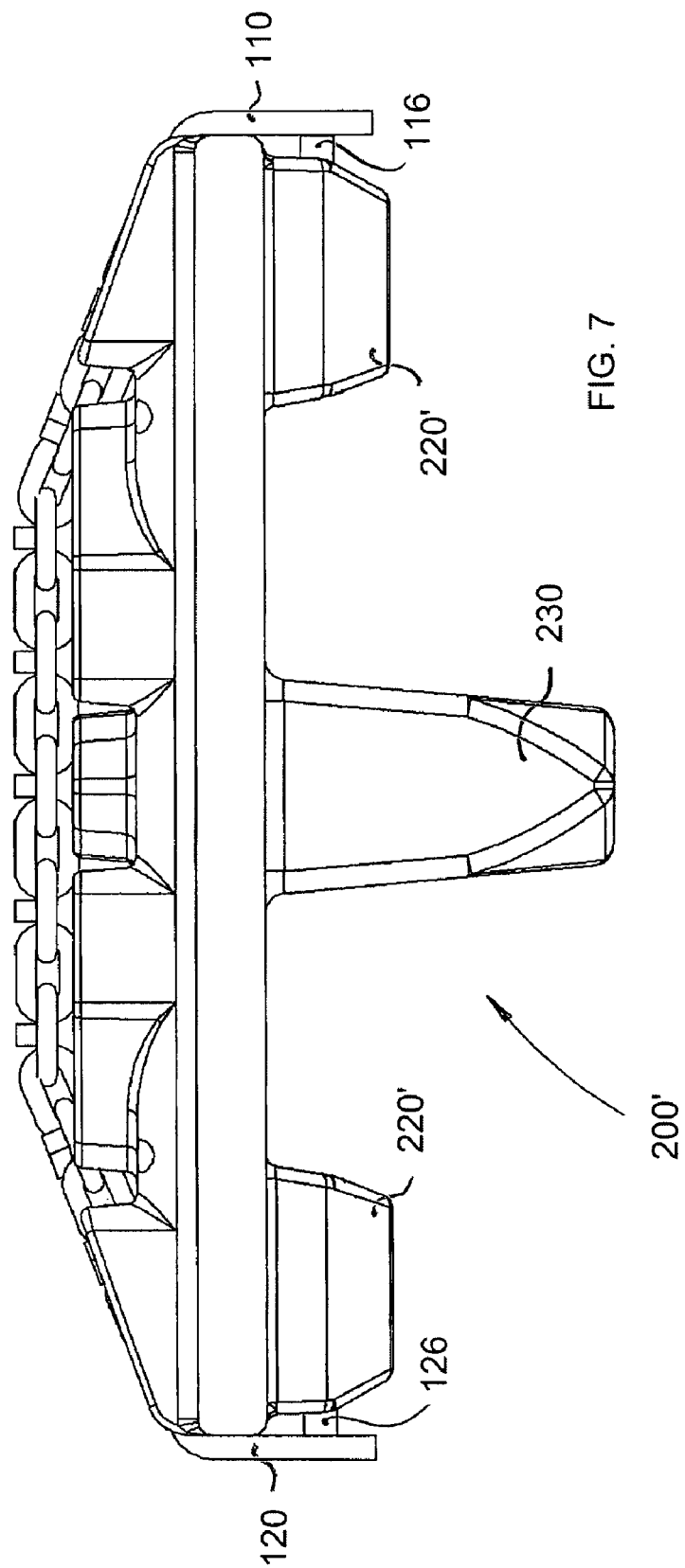
FIG. 7 is a longitudinal view of the embodiment shown in FIG. 1 as installed on a portion of a track different from the one shown in FIG. 5 and wherein the drive lugs are slightly offset from the side edges of the track.
Figure 8:
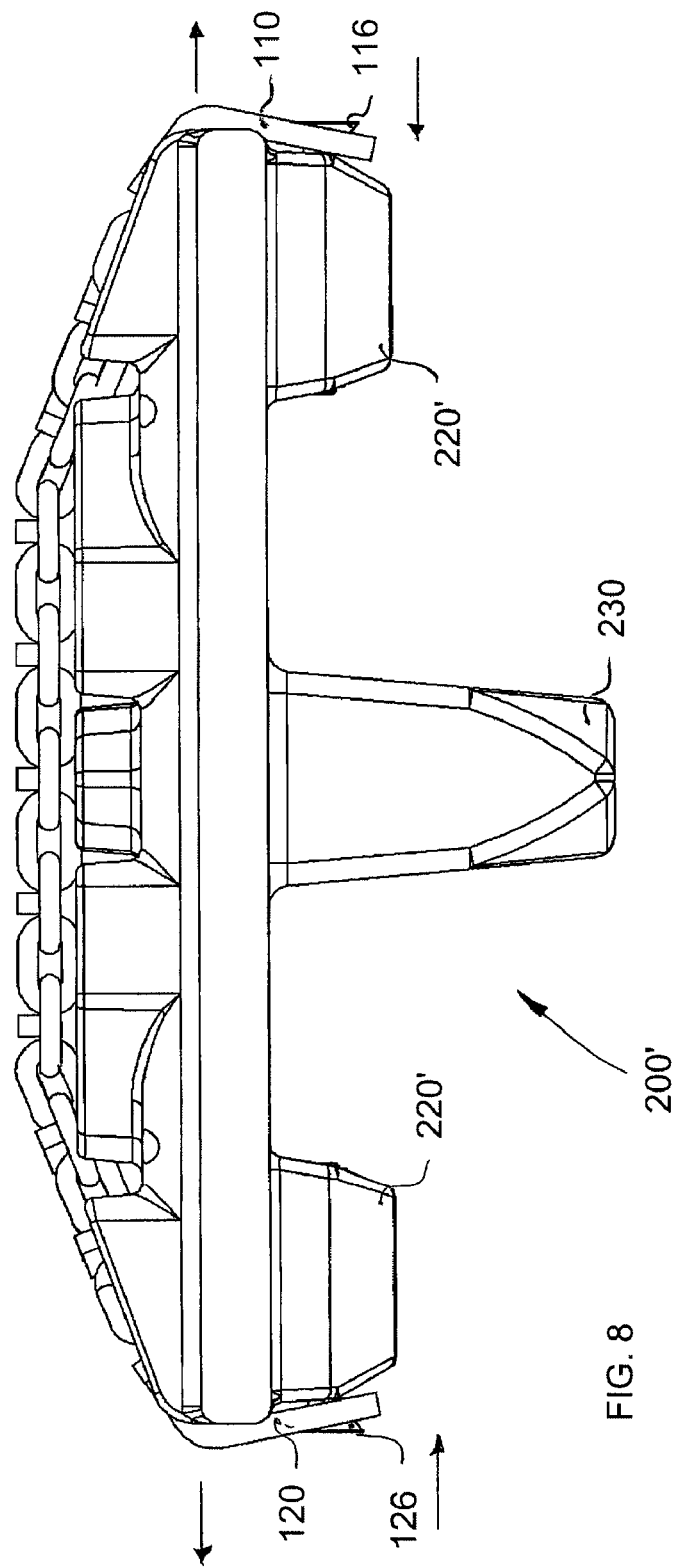
FIG. 8 is a longitudinal view of the embodiment shown in FIG. 7 wherein the traction chain assembly is tightened.

The traction chain assembly 100 of the present invention can also advantageously be used on track 200' which is a slight variant from the track 200. On track 200', the drive lugs 220', to which the side brackets 110 and 120 are mounted, are slightly offset from the side edges. As shown in FIGS. 7 and 8, when the drive lugs 220' are slightly away from the side edges of the track 200', a gap is defined between the side brackets 110 and 120 and the drive lugs 220'. By having this gap, it is possible to further screw the bolts 116 and 126 in order to laterally pull away the chain strands 130 and 140 via the leveraging action of the main portions and the fingers. This tightening action is best shown in FIG. 8 wherein by further screwing the bolts 116 and 126, the main portions 111 and 121 of the side brackets 110 and 120 are forced toward the drive lugs 220, thereby closing the gap. However, since the side brackets 110 and 120 abut on the side of the track 200', the inward movement of the main portions 111 and 121 generates an outward movement of the fingers, thereby tightening the chain strands 130 and 140 over the traction lugs 210. Understandably, the tightening of the traction chain assembly 100 can be done gradually in order to maintain a certain tension in the traction chain assembly 100.

Figure 11:
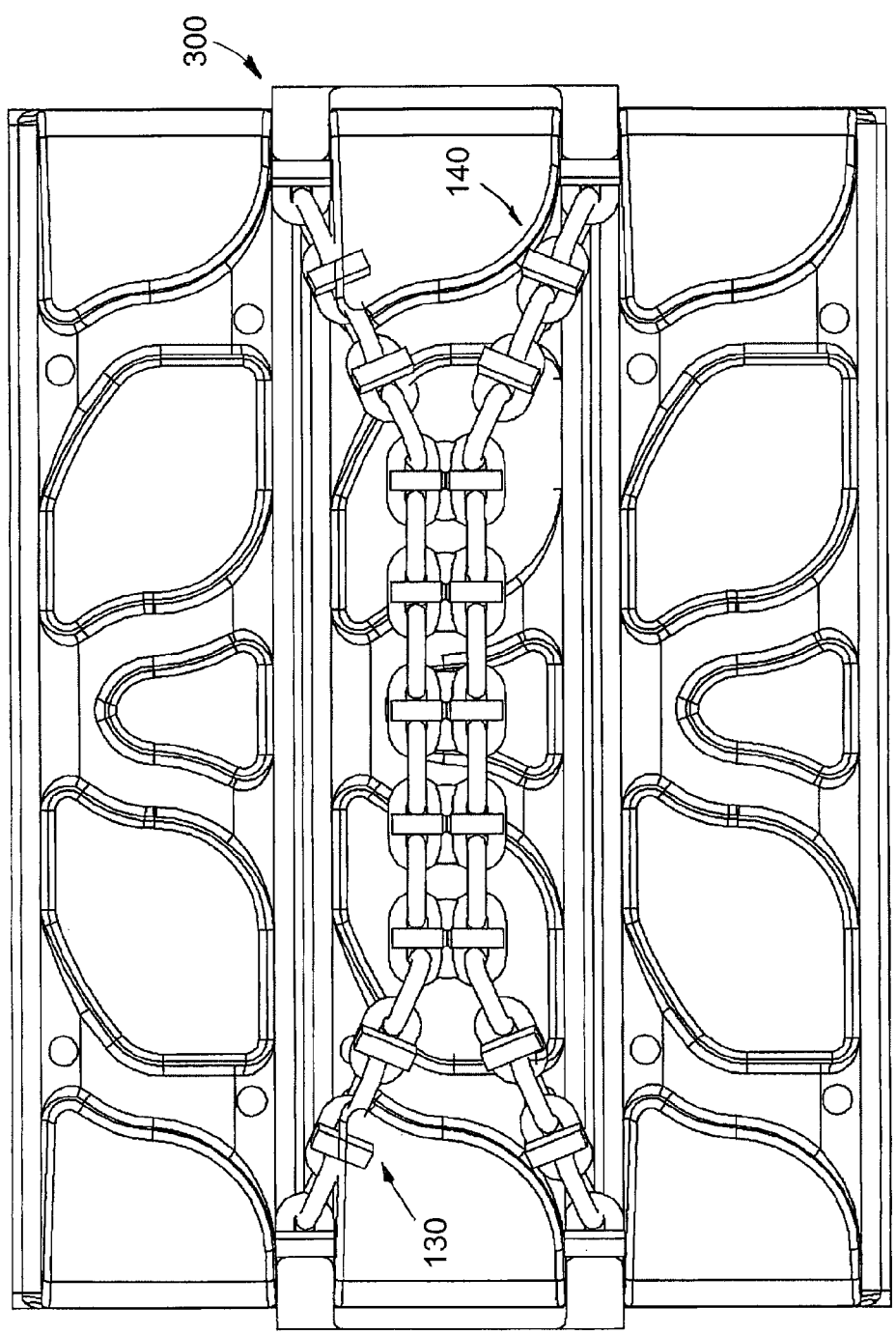
FIG. 11 is a top view of a variant of the embodiment of FIG. 1 as installed on a portion of a track.

Referring now to FIG. 11, a variant 300 of the traction chain assembly 100 of the present invention is shown. The sole difference between the traction chain assembly 300 and the traction assembly 100 is the fact that the chain strands 330 and 340 are secured together by more than two pairs of chain links and preferably by all the pairs of chain links which can effectively be welded together. Understandably, the number of pairs of chain links effectively welded together will vary according to the specific design and size of the traction chain assembly 300.

Figure 12:
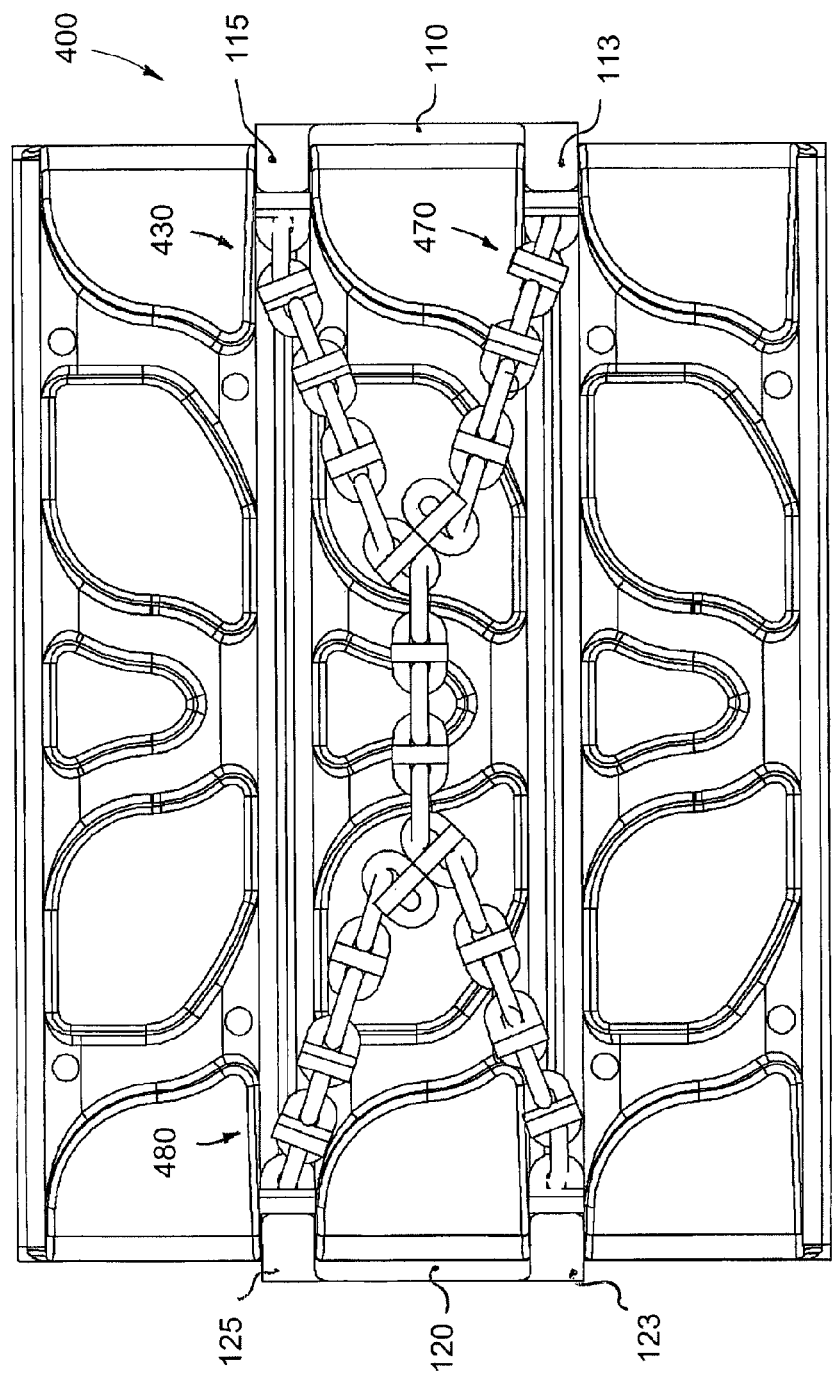
FIG. 12 is a top view of another variant of the embodiment of FIG. 1 as installed on a portion of a track.

Referring now to FIG. 12, another embodiment 400 of the present invention is shown. In this traction chain assembly 400, the configuration of the chain strands differs from the traction chain assemblies 100 and 300. The traction chain assembly 400 comprises a first chain strand 430 which extends laterally but also slightly obliquely. In fact, instead on extending between fingers 115 and 125 (or between fingers 113 and 123) as in traction chain assembly 100 and 300, the chain strand 430 extends diagonally between finger 115 and finger 123 (or between finger 113 and finger 125), thereby substantially crossing the traction lugs 210. The traction chain assembly 400 further comprises two short chain strands 470 and 480. Chain strand 470 extends between and is secured to finger 113 and the chain strand 430. Preferably, the chain strand 470 is connected to the chain strand 430 at a chain link locates at about a third of the length of the strand 430 when starting from finger 113. Similarly, chain strand 480 extends between and is secured to finger 125 and the chain strand 430. As for chain strand 470, the chain strand 480 is connected to the chain strand 430 at a chain link locates at about a third of the length of the strand 430 when starting from finger 125. Understandably, the mirror image of the embodiment shown in FIG. 12 is also within the scope of the invention.

Finally, the skilled addressee will readily understand that multiple traction chain assemblies could be mounted on a single track in order to increase the traction capability thereof.

While illustrative and presently preferred embodiments of the invention have been described in detail hereinabove, it is to be understood that the inventive concepts may be otherwise variously embodied and employed and that the appended claims are intended to be construed to include such variations except insofar as limited by the prior art.

The invention claimed is:

1. An elastomeric track comprising a first side edge and a second side edge and defining a ground engaging outer surface and an inner surface, said outer surface comprising traction lugs and said inner surface comprising drive lugs, said track comprising at least one traction chain assembly mounted thereto, said at least one traction chain assembly comprising:
   a. a first attachment bracket mounted to said first side edge of said track;
   b. a second attachment bracket mounted to said second side edge of said track;
   c. a first chain strand extending between said first and said second attachment brackets;
   wherein at least a portion of said first chain strand extends over at least one of said traction lugs.

2. An elastomeric track as claimed in claim 1, wherein said drive lugs of said inner surface are disposed near said first and said second side edges of said track.

3. An elastomeric track as claimed in claim 2, wherein said first attachment bracket is adapted to be mounted to one of said drive lugs located near said first side edge of said track and wherein said second attachment bracket is mounted to one of said drive lugs located near said second side edge of said track.

4. An elastomeric track as claimed in claim 1, wherein said first attachment bracket comprises a first outwardly extending projection and a second outwardly extending projection and said second attachment bracket comprises a third outwardly extending projection and a fourth outwardly extending projection, wherein said first and third projections are substantially laterally aligned and said second and fourth projections are substantially laterally aligned, and wherein said first chain strand extends between said first and third projections.

5. An elastomeric track as claimed in claim 1, wherein said first attachment bracket comprises a first outwardly extending projection and a second outwardly extending projection and said second attachment bracket comprises a third outwardly extending projection and a fourth outwardly extending projection, wherein said first and third projections are substantially laterally aligned and said second and fourth projections are substantially laterally aligned, and wherein said first chain strand extends between said first and fourth projections.

6. An elastomeric track as claimed in claim 1, wherein said first chain strand comprises a plurality of chain links and wherein at least one of said chain links comprises an outwardly extending projection.

7. An elastomeric track as claimed in claim 1, wherein said assembly further comprises a second chain strand, wherein said second chain strand extends between said first and said second attachment brackets and wherein at least a portion of said second chain strand extends over at least one of said traction lugs.

8. An elastomeric track as claimed in claim 7, wherein said first chain strand and said second chain strand are attached to each other.

9. An elastomeric track as claimed in claim 7, wherein said portion of said first chain strand and said portion of said second chain strand which extend over at least one of said traction lugs are attached to each other.

10. An elastomeric track as claimed in claim 7, wherein said first attachment bracket comprises a first outwardly extending projection and a second outwardly extending projection and said second attachment bracket comprises a third outwardly extending projection and a fourth outwardly extending projection, wherein said first and third projections are substantially laterally aligned and said second and fourth projections are substantially laterally aligned, and wherein said first chain strand extends between said first and third projections and said second chain strand extends between said second and fourth projections.

11. An elastomeric track as claimed in claim 7, wherein said second chain strand comprises a plurality of chain links and wherein at least one of said chain links comprises an outwardly extending projection.

12. An elastomeric track as claimed in claim 1, wherein said assembly further comprises a second chain strand and wherein said second chain strand extends between one of said first or second attachment bracket and said first chain strand.

13. An elastomeric track as claimed in claim 12, wherein at least a portion of said second chain strand extends over at least one of said traction lugs.

14. An elastomeric track as claimed in claim 12, wherein said second chain strand comprises a plurality of chain links and wherein at least one of said chain links comprises an outwardly extending projection.

15. An elastomeric track as claimed in claim 12, wherein said assembly further comprises a third chain strand and wherein said third chain strand extends between one of said first or second attachment bracket and said first chain strand.

16. An elastomeric track as claimed in claim 15, wherein at least a portion of said third chain strand extends over at least one of said traction lugs.

17. An elastomeric track as claimed in claim 15, wherein said third chain strand comprises a plurality of chain links and wherein at least one of said chain links comprises an outwardly extending projection.

18. An elastomeric track having a first side edge and a second side edge and defining an outer surface and an inner surface, said outer surface comprising traction lugs and said inner surface comprising drive lugs, said track comprising at least one traction chain assembly mounted thereto and over at least one of said traction lugs, said traction chain assembly comprising:
 a. a first attachment bracket mounted to a first one of said drive lugs located near said first side edge of said track;
 b. a second attachment bracket mounted to a second one of said drive lugs located near said second side edge of said track;
 c. a first chain strand extending between said first and said second attachment brackets;
 wherein a portion of said first chain strand extends over at least one of said traction lugs.

19. A track as claimed in claim 18, wherein a first gap exists between said first attachment bracket and said first drive lug and a second gap exists between said second attachment bracket and said second drive lug.

20. A track as claimed in claim 19, wherein by forcing said first attachment bracket toward said first drive lug, thereby reducing said first gap and/or by forcing said second attachment bracket toward said second drive lug, thereby reducing said second gap, said first chain strand is tensioned.

* * * * *